(12) United States Patent
Lee et al.

(10) Patent No.: US 11,287,667 B2
(45) Date of Patent: Mar. 29, 2022

(54) SPATIAL FILTERING APPARATUS AND METHOD OF SPATIAL FILTERING USING THE SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Duhyun Lee, Yongin-si (KR); Andrei Faraon, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 474 days.

(21) Appl. No.: 16/362,020

(22) Filed: Mar. 22, 2019

(65) Prior Publication Data
US 2019/0293955 A1    Sep. 26, 2019

Related U.S. Application Data

(60) Provisional application No. 62/647,221, filed on Mar. 23, 2018.

(30) Foreign Application Priority Data

Jan. 14, 2019  (KR) .................... 10-2019-0004634
Feb. 18, 2019  (KR) .................... 10-2019-0018820

(51) Int. Cl.
*G02B 27/46*  (2006.01)
*G01J 4/00*   (2006.01)
*G02B 27/42*  (2006.01)

(52) U.S. Cl.
CPC ............ *G02B 27/46* (2013.01); *G01J 4/00* (2013.01); *G02B 27/4261* (2013.01); *G01J 2004/002* (2013.01)

(58) Field of Classification Search
CPC .. G02B 27/46; G02B 27/4261; G02B 27/286; G02B 27/283; G02B 27/42; G01J 4/00;
(Continued)

(56) References Cited

U.S. PATENT DOCUMENTS 4,619,527 A   10/1986   Leuenberger et al.
5,692,072 A   11/1997   Hashimoto
(Continued)

OTHER PUBLICATIONS

Saba et al., "Two Dimensional Edge Detection by Guided Mode Resonant Metasurface", Cornell University, Nov. 21, 2017, pp. 1-11 (11 pages total).
(Continued)

*Primary Examiner* — Balram T Parbadia
(74) *Attorney, Agent, or Firm* — Sughrue Mion, PLLC

(57) ABSTRACT

A spatial filtering apparatus includes a composite filter including first filter patterns respectively having a first phase profile, and second filter patterns respectively having a second phase profile, wherein the first filter patterns and the second filter patterns overlap with each other, wherein first light in a first polarization direction that is emitted on the composite filter is first spatially filtered by the first filter patterns, and wherein second light in a second polarization direction that is emitted on the composite filter is second spatially filtered by the second filter patterns.

18 Claims, 16 Drawing Sheets

(58) Field of Classification Search
CPC ...... G01J 2004/002; G06T 5/003; G06T 5/20; G06T 5/002
See application file for complete search history.

(56) References Cited

U.S. PATENT DOCUMENTS

| | | | | |
|---|---|---|---|---|
| 6,404,554 | B1 * | 6/2002 | Lee | G02B 5/1814 359/576 |
| 7,369,186 | B2 * | 5/2008 | Momoki | G02B 5/3041 349/9 |
| 10,386,649 | B2 * | 8/2019 | Yamaguchi | G02B 27/286 |
| 2003/0156325 | A1 * | 8/2003 | Hoshi | G02B 5/1809 359/487.02 |
| 2004/0239881 | A1 * | 12/2004 | Kim | G03B 33/10 353/20 |
| 2014/0185044 | A1 * | 7/2014 | Ishikawa | G01N 21/956 356/369 |

OTHER PUBLICATIONS

Gorodeisky & Friesem, "Phase filters for correlators with incoherent light", Optics Communications, vol. 100, No. 5-6, Jul. 15, 1993, pp. 421-425, (5 pages total).

Leith & Angell, "Generalization of some incoherent spatial filtering techniques", Applied Optics, vol. 25, No. 4, Feb. 15, 1986, pp. 499-502 (4 pages total).

Lohmann & Rhodes, "Two-pupil synthesis of optical transfer functions", Applied Optics, vol. 17, No. 7, Apr. 1, 1978, pp. 1141-1151 (11 pages total).

Joseph N. Mait, "Pupil-function design for bipolar incoherent spatial filtering", Optical Society of America, vol. 3, No. 11, Nov. 1986, pp. 1826-1832, (7 pages total).

Ting-Chung Poon, "Scanning holography an two-dimensional image processing by acousto-optic two-pupil synthesis", Optical Society of America, vol. 2, No. 4, Apr. 1985, pp. 521-527 (7 pages total).

Arbabi et al., "Dielectric Metasurfaces for Complete Control of Phase and Polarization with Subwavelength Spatial Resolution and High Transmission", Nature Nanotechnology, vol. 10, Sep. 4, 2015, pp. 1-27 (27 pages total).

William T. Rhodes, "Incoherent spatial filtering", Optical Engineering, vol. 19, No. 3, Jun. 1980, pp. 323-330 (8 pages total).

* cited by examiner

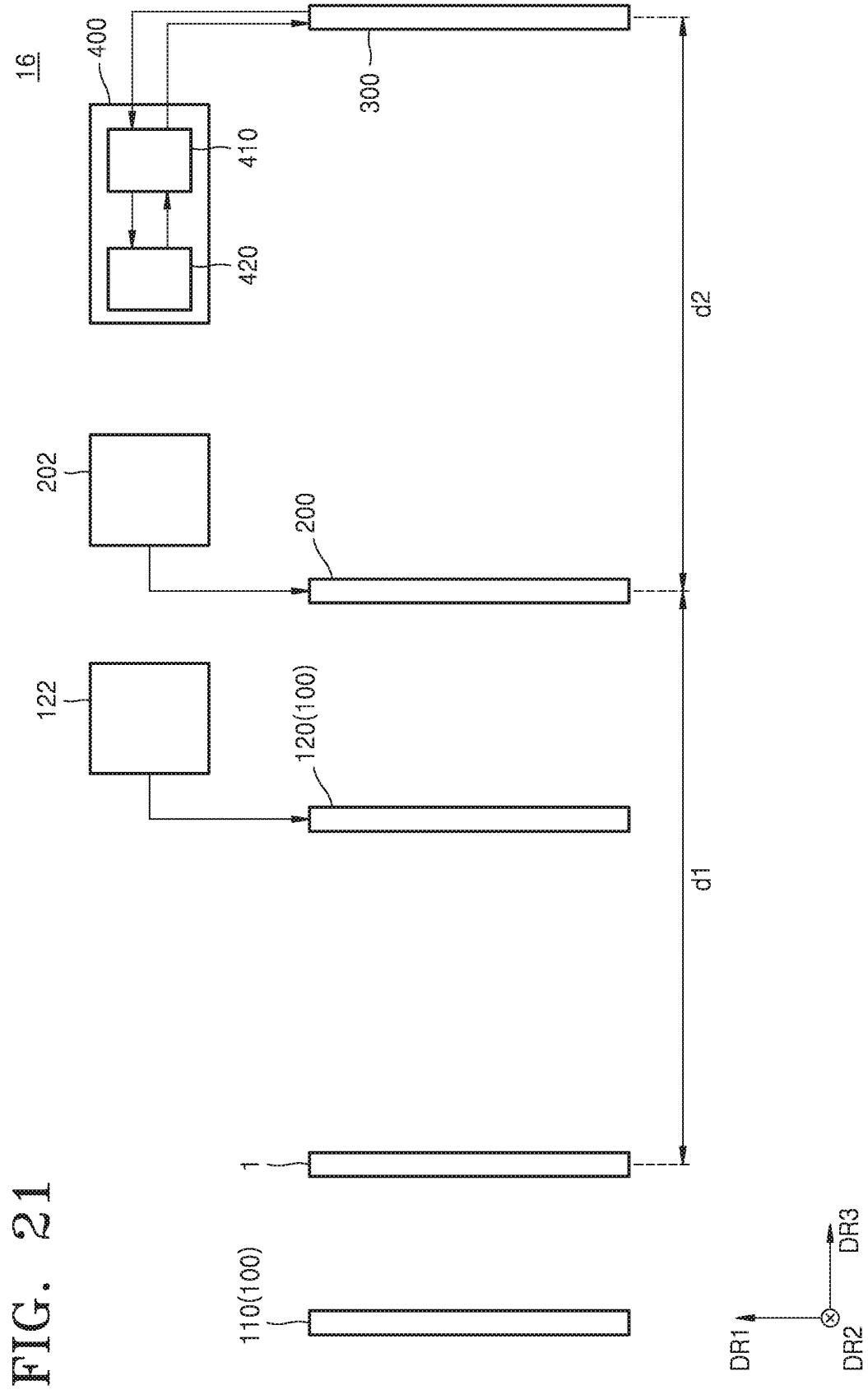

SPATIAL FILTERING APPARATUS AND METHOD OF SPATIAL FILTERING USING THE SAME

CROSS-REFERENCE TO RELATED APPLICATIONS

This application claims the benefit of U.S. Provisional Application No. 62/647,221, filed on Mar. 23, 2018 in the U.S. Patent Office and priority from Korean Patent Application Nos. 10-2019-0004634 and 10-2019-0018820, respectively filed on Jan. 14, 2019 and Feb. 18, 2019 in the Korean Intellectual Property Office, the disclosures of which are incorporated herein in their entireties by reference.

BACKGROUND

1. Field

Example embodiments of the present disclosure relate to spatial filtering apparatuses and methods of spatial filtering using the spatial filtering apparatuses.

2. Description of the Related Art

An optical device that changes polarized light, phase, intensity, and path of incident light is used in various optical apparatuses. Also, in order to control the above properties of light in an optical system with a desired method, light modulators of various structures are proposed.

A spatial filter is used for improving an image. A spatial filter includes a low pass filter and a high pass filter. The low pass filter is used to remove data of a high spatial frequency like noise, and the high pass filter is used to remove a low spatial frequency like a stripe.

SUMMARY

One or more example embodiments provide spatial filtering apparatuses configured to reduce a spatial filtering time and spatial filtering cost and methods of spatial filtering.

One or more example embodiments provide spatial filtering apparatuses configured to spatially filter incoherent light and unpolarized light and methods of spatial filtering.

Additional aspects will be set forth in part in the description which follows and, in part, will be apparent from the description, or may be learned by practice of the example embodiments.

According to an aspect of an example embodiment, there is provided a spatial filtering apparatus including a composite filter that includes first filter patterns respectively having a first phase profile, and second filter patterns respectively having a second phase profile, wherein the first filter patterns and the second filter patterns overlap with each other, wherein first light in a first polarization direction that is incident on the composite filter is first spatially filtered by the first filter patterns, and wherein second light in a second polarization direction that is incident on the composite filter is second spatially filtered by the second filter patterns.

The first filter patterns may extend in the first polarization direction, the second filter patterns may extend in the second polarization direction, and the first filter patterns may cross the second filter patterns.

The composite filter may further include a lower electrode layer, an upper electrode layer provided on the lower electrode layer, and an active layer provided between the lower electrode layer and the upper electrode layer, wherein the first filter patterns and the second filter patterns are provided on the upper electrode layer opposite to the active layer.

The spatial filtering apparatus may further include a filter controller configured to generate a voltage difference between the lower electrode layer and the upper electrode layer, wherein a refractive index of the active layer may be controlled by an electric field generated between the lower electrode layer and the upper electrode layer.

Each of the first filter patterns may have a length corresponding to the first phase profile in the first polarization direction, and each of the second filter patterns may have a length corresponding to the second phase profile in the second polarization direction.

The first phase profile may include a sum of a phase profile of a Fourier transform element and a phase profile of a first phase modulation element, the second phase profile may include a sum of the phase profile of a Fourier transform element and a phase profile of a second phase modulation element, the first light may be Fourier transformed by the Fourier transform element and is first phase modulated by the first phase modulation element, and the second light may be Fourier transformed by the Fourier transform element and is second phase modulated by the second phase modulation element.

The spatial filtering apparatus may further include a polarizer configured to selectively provide the first light and the second light to the composite filter.

The polarizer may include a polarizer, and a polarization rotator, wherein the polarizer is configured to generate polarized light by polarizing external light received from the outside and provide the polarized light to the polarization rotator, and the polarization rotator is configured to selectively rotate a polarization direction of the received polarized light and provide the first light and second light to the composite filter.

The spatial filtering apparatus may further include a polarization controller configured to control the polarization rotator, wherein the polarization controller may be configured to selectively rotate the polarization direction of the polarized light by controlling the polarization rotator.

The polarization direction of the polarized light may be maintained by an electrical signal applied to the polarization rotator by the polarization controller, and the polarization direction of the polarized light may be rotated when an electrical signal is not applied to the polarization rotator.

The spatial filtering apparatus may further include a light receiver provided on a side opposite to the polarization rotator with respect to the composite filter, and the light receiver is configured to detect the first light and the second light that are respectively emitted from an object and generated by being sequentially transmitted through the polarizer and the polarization rotator.

The polarization rotator and the polarizer may be provided opposite to each other with the object therebetween.

The spatial filtering apparatus, wherein a distance between the object and the composite filter may be twice the focal length of the composite filter, and a distance between the light receiver and the composite filter may be twice the focal length of the composite filter.

According to an aspect of an example embodiment, there is provided a method of spatial filtering, the method including generating first light and second light by selectively rotating polarized light, performing a first spatial filtering process and a second spatial filtering process to the first light and the second light, respectively, generating first image data and second image data based on the first light and the second light, and generating filtering image data based on the first image data and the second image data.

The first spatial filtering process may include providing the first light to first filter patterns such that the first light pass through the first filter patterns having a first phase profile, and the second spatial filtering process may include providing the second light to second filter patterns such that the second light pass through the second filter patterns having a second phase profile, wherein the first phase profile and the second phase profile may be different from each other.

The first spatial filtering process may include performing a Fourier transform on the first light, and performing a first phase modulation process modulating a phase of the first light, and the second spatial filtering process may include performing a Fourier transform on the second light, and performing a second phase modulation process modulating a phase of the second light.

The generating of the filtering image data may include subtracting the second image data from the first image data.

The polarized light may be generated by polarizing external light, and the external light includes incoherent light and unpolarized light.

According to an aspect of an example embodiment, there is provided a spatial filtering apparatus including a polarizer, a composite filter, a light receiver, and an image controller, wherein the polarizer is configured to selectively provide first light in a first polarization direction and second light in a second polarization direction to the composite filter, the composite filter is configured to spatially filter the first light and the second light, and provide the first light and the second light to the light receiver, the light receiver is configured to provide first image data obtained based on the first light and second image data obtained based on the second light to the image controller, and the image controller is configured to generate filtering image data based on the first image data and the second image data.

The composite filter may include first filter patterns having a first phase profile, and second filter patterns having a second phase profile, wherein the first filter patterns overlap with the second filter patterns, and wherein the first light is first spatially filtered by the first filter patterns and the second light is second spatially filtered by the second filter patterns.

BRIEF DESCRIPTION OF THE DRAWINGS

The above and/or other aspects will become apparent and more readily appreciated from the following description of example embodiments, taken in conjunction with the accompanying drawings in which:

FIG. 21 is a conceptual diagram of a spatial filtering apparatus according to example embodiments.

DETAILED DESCRIPTION

Figure 1:
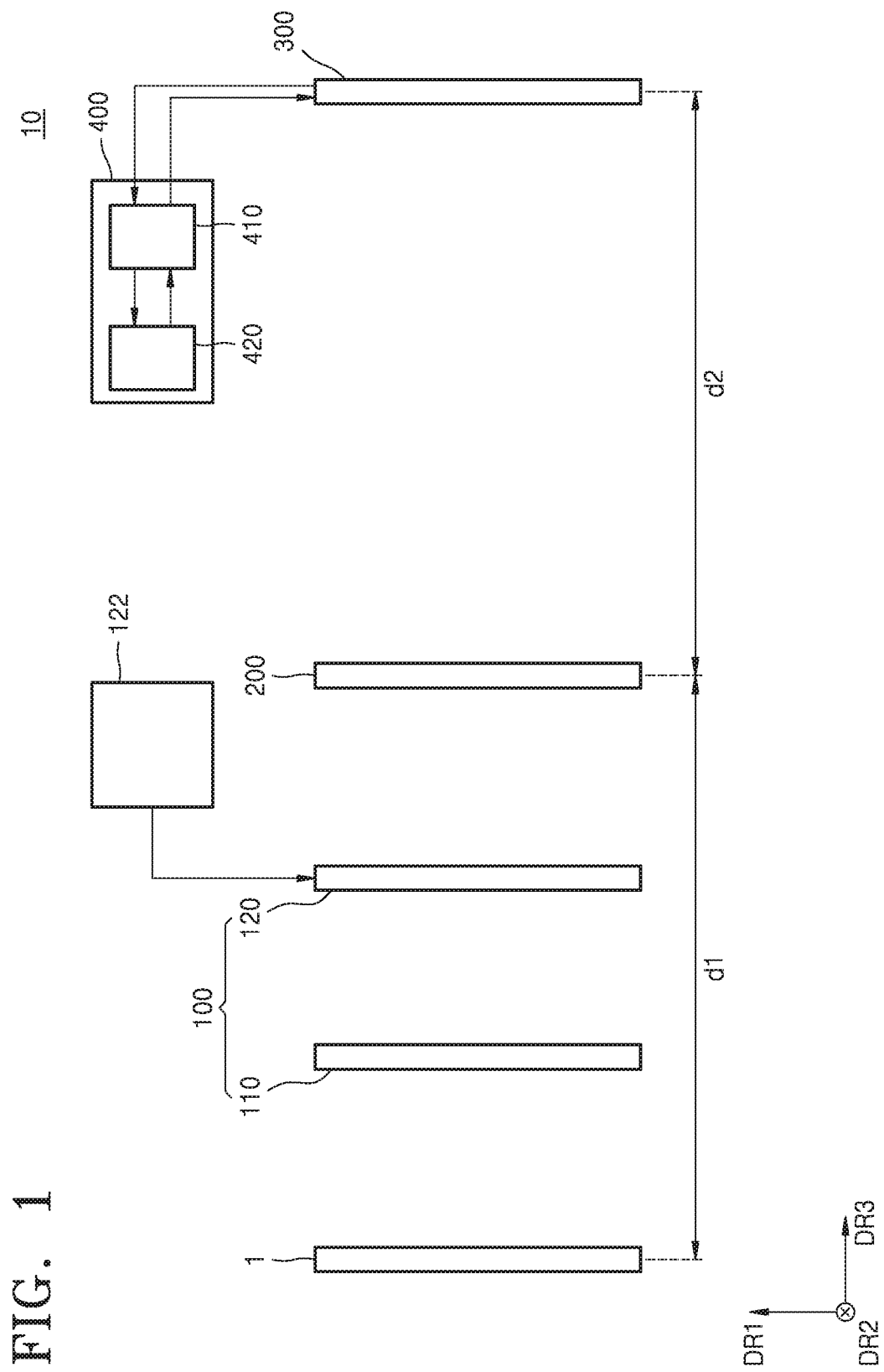
FIG. 1 is a conceptual diagram of a spatial filtering apparatus according to example embodiments.

Reference will now be made in detail to example embodiments, examples of which are illustrated in the accompanying drawings. In the drawings, like reference numerals refer to like elements throughout and thicknesses of layers and regions may be exaggerated for clarity of layers and regions. In this regard, the example embodiments may have different forms and should not be construed as being limited to the descriptions set forth herein.

It will be understood that when an element or layer is referred to as being "on" or "above" another element or layer, the element or layer may be directly on another element or layer or intervening elements or layers.

As used herein, the singular forms are intended to include the plural forms as well, unless the context clearly indicates otherwise. It should be understood that, when a part "comprises" or "includes" an element in the specification, unless otherwise defined, other elements are not excluded from the part and the part may further include other elements.

As used herein, the term "and/or" includes any and all combinations of one or more of the associated listed items. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Also, in the specification, the term "units" or " . . . modules" denote units or modules that process at least one function or operation, and may be realized by hardware, software, or a combination of hardware and software.

Figure 2:
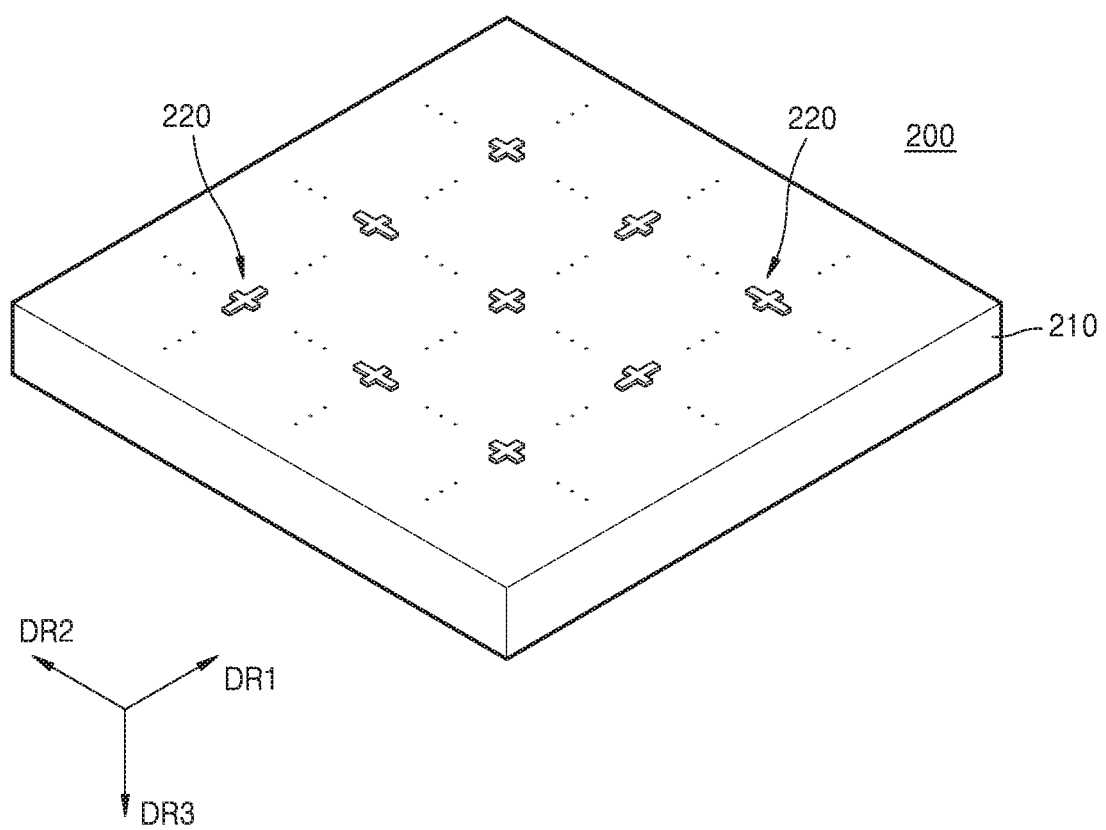
FIG. 2 is a perspective view of a composite filter of FIG. 1.
Figure 3:
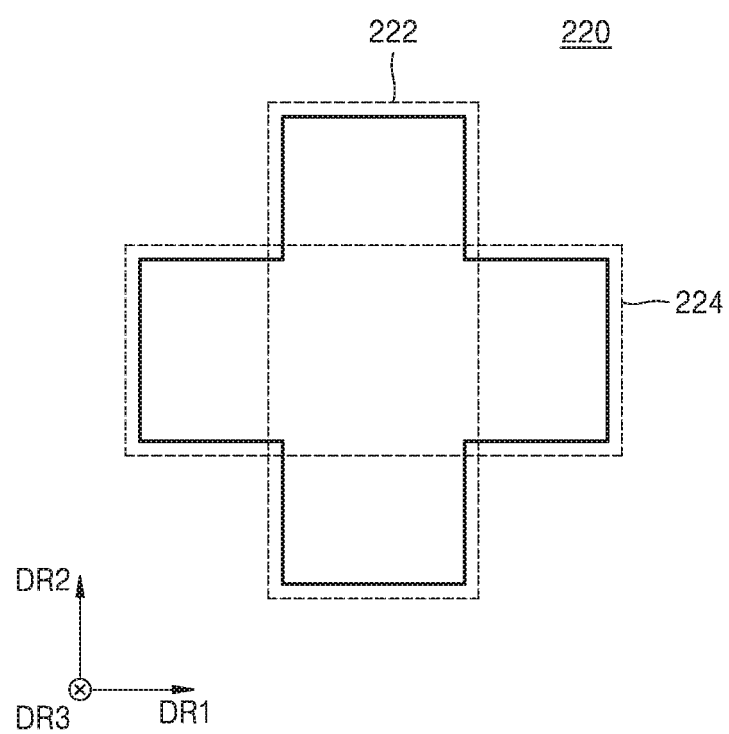
FIG. 3 is a plan view of a filter pattern of FIG. 2.

FIG. 1 is a conceptual diagram of a spatial filtering apparatus 10 according to example embodiments. FIG. 2 is a perspective view of a composite filter 200 of FIG. 1. FIG. 3 is a plan view of a filter pattern of FIG. 2.

Referring to FIG. 1, the spatial filtering apparatus 10 including a polarizer 100, the composite filter 200, a polarization controller 122, a light receiver 300, and an image controller 400 may be provided. The polarizer 100 may receive external light from an object 1. For example, the object 1 may include a material that emits the external light. The external light may include image information of the object 1. The external light may include incoherent light and unpolarized light.

The polarizer 100 may polarize the received external light. The polarizer 100 may include a polarizer 110 and a polarization rotator 120. The polarizer 110 may polarize the external light in a first polarization direction. For example, the first polarization direction may be parallel to a first direction DR1. Light emitted from the polarizer 110 may be referred to as polarized light. The polarizer 110 may provide the polarized light to the polarization rotator 120.

The polarization rotator 120 may selectively rotate a polarization direction of the polarized light received from the polarizer 110. For example, the polarization rotator 120 may include a twisted nematic liquid crystal (TNLC) rotator. The polarization rotator 120 may have an On-state or an Off-state. When the polarization rotator 120 is in an On-state, the polarization controller 122 may apply an electrical signal to the polarization rotator 120. When the polarization controller 122 applies an electrical signal to the polarization rotator 120, the polarization rotator 120 may not rotate the polarization direction of the polarized light. The polarization rotator 120 may emit first light in a first polarization direction based on the polarized light. When the polarization rotator 120 in in an Off-state, the polarization controller 122 may not apply an electrical signal to the polarization rotator 120. The polarization rotator 120 may rotate the polarization direction of the polarized light when the polarization controller 122 does not apply an electrical signal to the polarization rotator 120. For example, the polarization rotator 120 may rotate the polarization direction of the received light by an angle of 90°. The polarization rotator 120 may emit second light in a second polarization direction based on the polarized light. For example, the second polarization direction may be parallel to a second direction DR2. The second polarization direction may cross the first polarization direction. For example, the second polarization direction may be perpendicular to the first polarization direction. The polarization rotator 120 may provide the first light and the second light to the composite filter 200.

The composite filter 200 may perform a first spatial filtering process and a second spatial filtering process, respectively, with respect to the first light and the second light. The composite filter 200 may provide the first light and the second light that are spatially filtered to the light receiver 300. Referring to FIGS. 2 and 3, the composite filter 200 may include a substrate 210 and composite filter patterns 220. The substrate 210 may include a material transparent to light incident to the composite filter 200. For example, the substrate 210 may include glass.

The composite filter patterns 220 may be arranged on the substrate 210. The composite filter patterns 220 may be arranged on the substrate 210 in the first and second directions DR1 and DR2 that are parallel to the substrate 210. The composite filter patterns 220 may be separated from each other. The composite filter patterns 220 may include at least a pair of composite filter patterns 220 having shapes different from each other.

Referring to FIG. 3, each of the composite filter patterns 220 may include a first filter pattern 222 and a second filter pattern 224. The first filter patterns 222 may perform a first spatial filtering with respect to the first light. For example, the first filter patterns 222 may perform a Fourier transform process and a first phase modulation process with respect to the first light. The first filter patterns 222 may extend in the first direction DR1. Lengths of the first filter patterns 222 may correspond to a phase profile of the first filter patterns 222. A phase profile of the first filter patterns 222 may include a sum of a phase profile of a Fourier transform element and a phase profile of a first phase modulation element. The Fourier transform element may be an optical element that performs a Fourier transform with respect to the first light and the second light. For example, the Fourier transform element may be a Fourier transform lens. The first phase modulation element may be an optical element that modulates a phase of the first light that is Fourier transformed. For example, the first phase modulation element may be a phase filter.

The second filter patterns 224 may perform a second spatial filtering with respect to the second light. For example, the second filter patterns 224 may perform a Fourier transform process and a second phase modulation process with respect to the second light. The second filter patterns 224 may cross the first filter patterns 222 by extending in the second direction DR2. For example, the first and second filter patterns 222 and 224 may be perpendicular to each other. The first and second filter patterns 222 and 224 may overlap with each other. Lengths of the second filter patterns 224 may correspond to a phase profile of the second filter patterns 224. A phase profile of the second filter patterns 224 may include a sum of a phase profile of a Fourier transform element and a phase profile of a second phase modulation element. The Fourier transform element may be an optical element that performs the Fourier transform with respect to the first light and the second light. For example, the Fourier transform element may be a Fourier transform lens. The second phase modulation element may be an optical element that modulates a phase of the second light that is Fourier transformed. For example, the second phase modulation element may be a phase filter.

Referring to FIG. 1, the light receiver 300 may be arranged on a side opposite to the polarizer 100 with respect to the composite filter 200. The light receiver 300 may detect the first light and the second light. For example, the light receiver 300 may include an image sensor. The light receiver 300 may generate first image data based on the first light received from the composite filter 200. The first image data may include information of an image that is formed by the first light transmitted through the composite filter 200. The light receiver 300 may generate second image data based on the second light received from the composite filter 200. The second image data may include information of an image that is formed by the second light transmitted through the composite filter 200. The light receiver 300 may provide the first image data and the second image data to the image controller 400.

The image controller 400 may include a processor 410 and a memory 420. The processor 410 may generate filtering image data based on the first image data and the second image data. For example, the filtering image data may be generated by performing a subtraction operation in which the second image data are subtracted from the first image data in each pixel. When the filtering image data is generated, the processor 410 may store the first image data and the second image data received from the light receiver 300 in the memory 420. When the filtering image data is generated, the processor 410 may retrieve the first image data and the second image data from the memory 420, and may perform a subtraction operation on the first image data and the second image data. Accordingly, the filtering image data may be generated.

The object 1 and the composite filter 200 may be spaced apart from each other by a first distance d1. The composite filter 200 and the light receiver 300 may be spaced apart from each other by a second distance d2. In example embodiments, the first distance d1 and second distance d2, respectively, may be two times of a focal length of the composite filter 200. Accordingly, the spatial filtering apparatus 10 may include a 4F system.

The present disclosure may provide the spatial filtering apparatus 10 that generates the filtering image data by controlling the polarizer 100, and may provide the spatial filtering apparatus 10 that may perform a spatial filtering without replacing an optical device, for example, a phase filter. The present disclosure may provide the spatial filtering apparatus 10 that may perform a spatial filtering by using hardware, and may provide the spatial filtering apparatus 10 that may reduce a spatial filtering time and cost. The present disclosure may provide the spatial filtering apparatus 10 that may filter incoherent light and unpolarized light.

Figure 4:
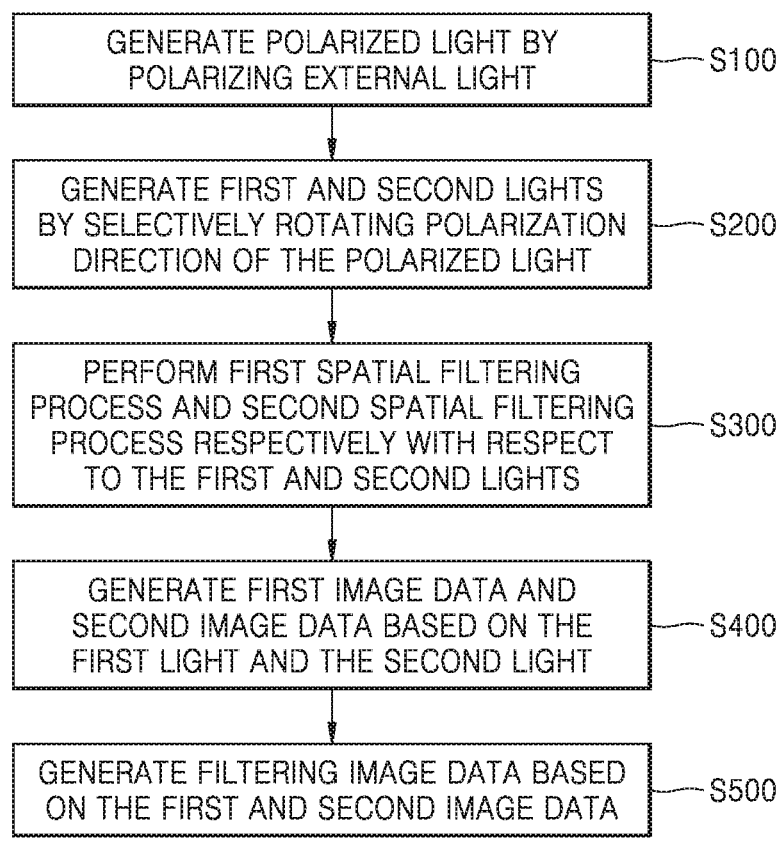
FIG. 4 is a flowchart of a method of spatial filtering according to example embodiments.
Figure 5:
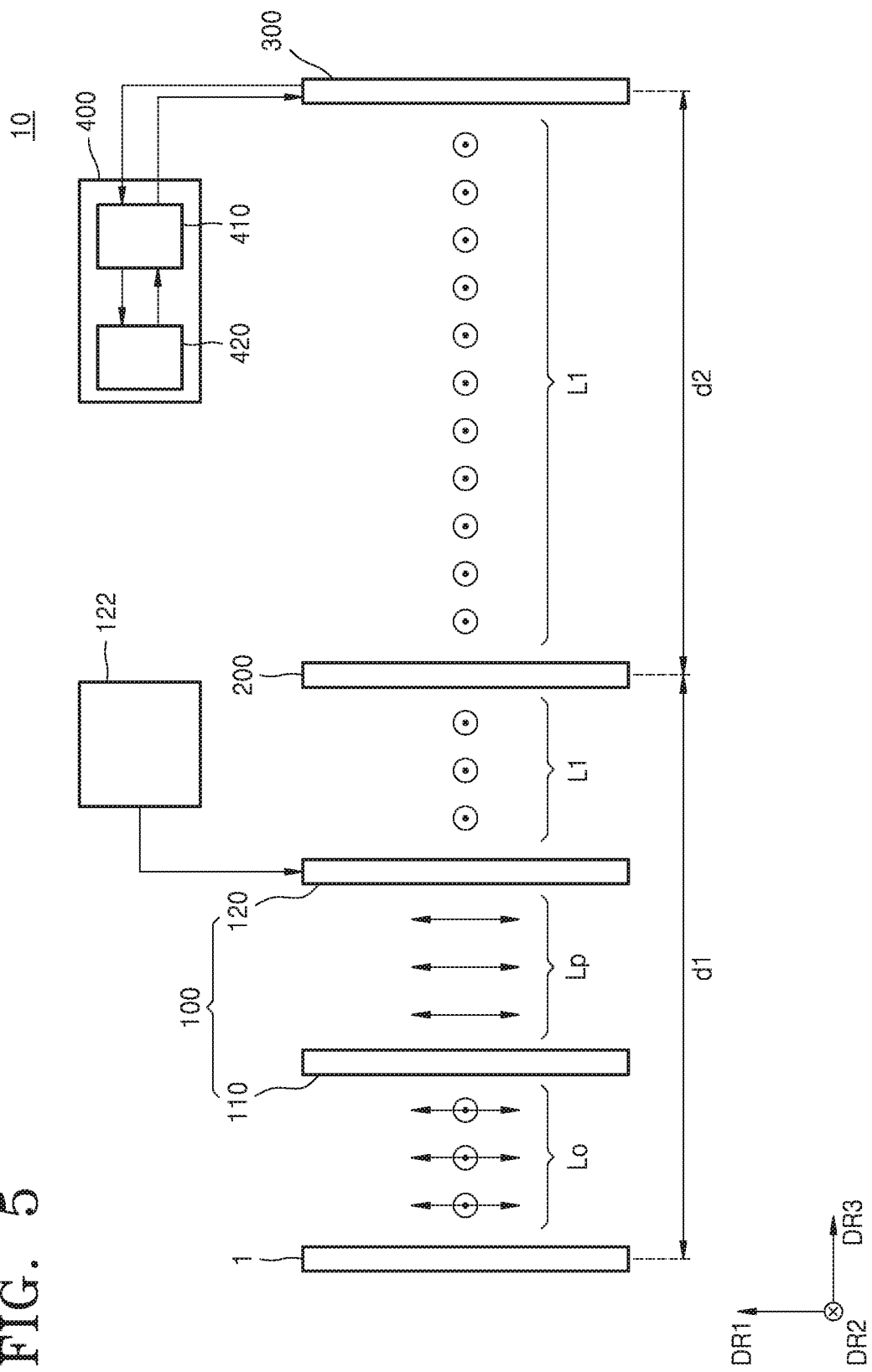
FIGS. 5 and 6 are conceptual diagrams of a spatial filtering apparatus for explaining the method of spatial filtering of FIG. 4.
Figure 6:
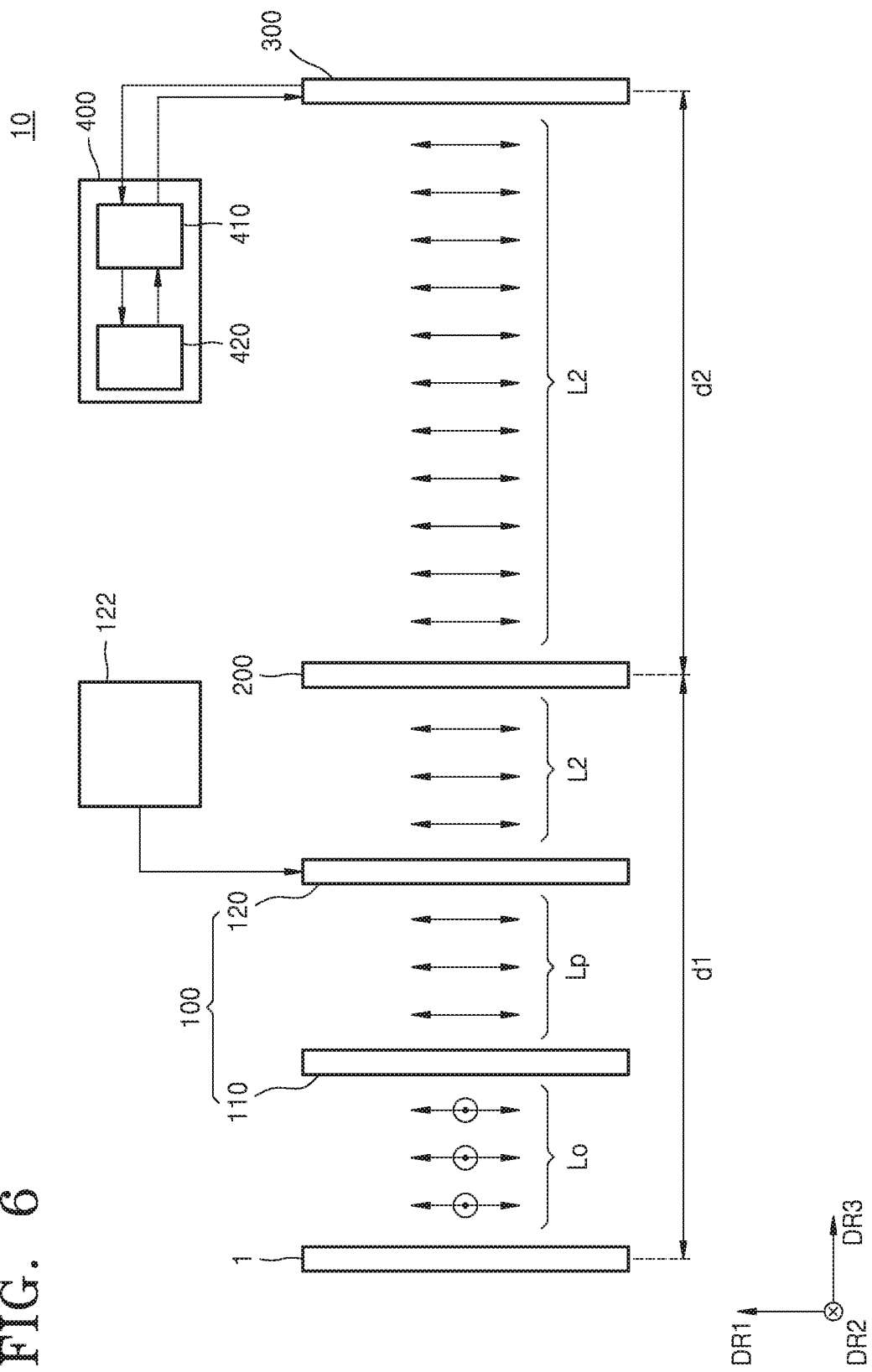
Figure 7:
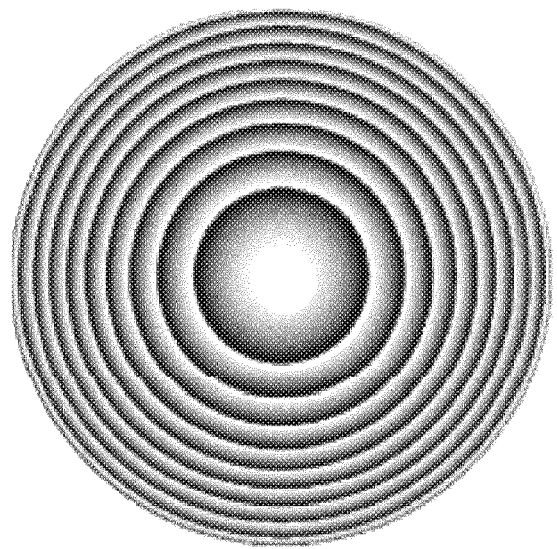
FIG. 7 shows a phase profile of a Fourier transform element according to an example embodiment.
Figure 8:
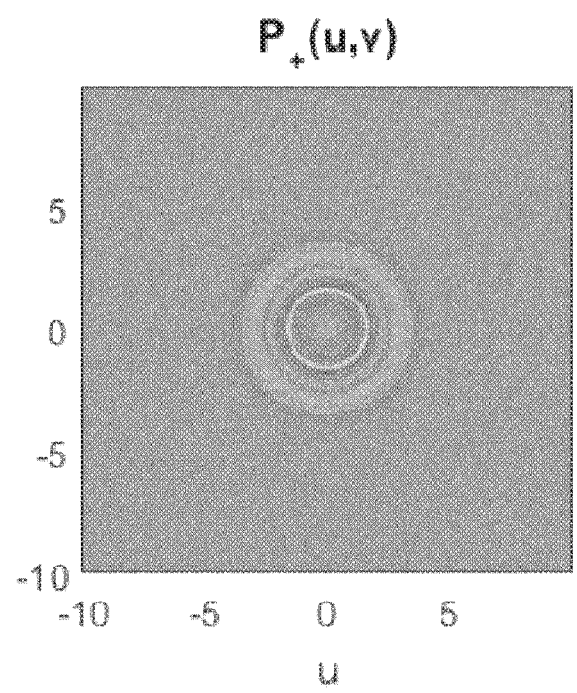
FIG. 8 shows a phase profile of a first filter according to an example embodiment.
Figure 9:
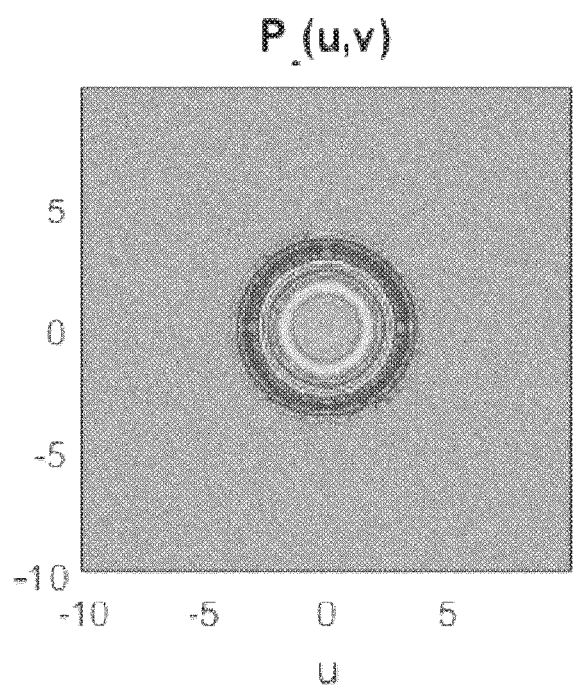
FIG. 9 shows a phase profile of a second filter according to an example embodiment.
Figure 10:
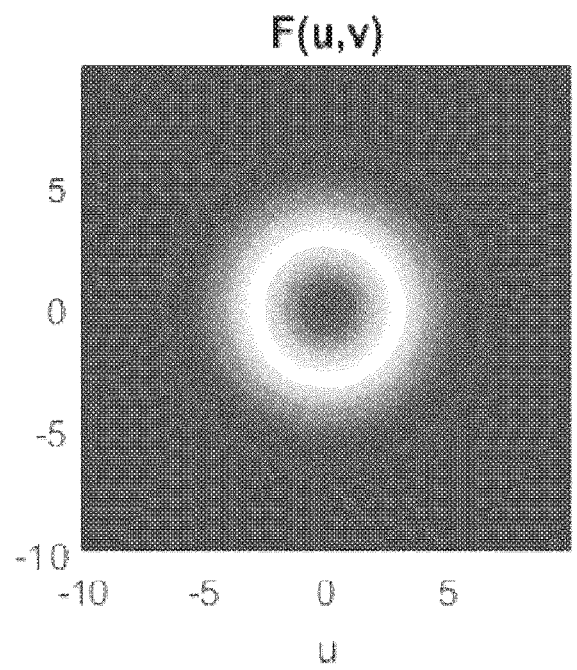
FIG. 10 shows a phase profile of a composite filter according to an example embodiment.

FIG. 4 is a flowchart of a method of spatial filtering according to example embodiments. FIGS. 5 and 6 are conceptual diagrams of the spatial filtering apparatus 10 for explaining the method of spatial filtering of FIG. 4. FIG. 7 shows a phase profile of a Fourier transform element, FIG. 8 shows a phase profile of a first filter, FIG. 9 shows a phase profile of a second filter, and FIG. 10 shows a phase profile of a composite filter 200 according to example embodiments.

Referring to FIGS. 4, 5, and 6, external light Lo may be emitted from the object 1. For example, the external light Lo may include incoherent light and unpolarized light. The object 1 may provide the external light Lo to the polarizer 110.

The polarizer 110 may polarize the external light Lo received from the object 1, and thus, may emit polarized light Lp (S100). The polarized light Lp may be polarized in the first polarization direction. For example, the first polarization direction may be parallel to the first direction DR1. The polarizer 110 may provide the polarized light Lp to the polarization rotator 120.

The polarization rotator 120 may emit the first light L1 and the second light L2 by selectively rotating the polarization direction of the polarized light Lp received from the polarizer 110 (S200). For example, when the polarization rotator 120 is in an Off-state, the polarization rotator 120 may rotate the polarization direction of the polarized light Lp. The Off-state of the polarization rotator 120 may be a state that an electric signal is not applied to the polarization rotator 120. The state of the polarization rotator 120 may be controlled by the polarization controller 122. For example, the polarization rotator 120 may rotate the polarization direction of the polarized light Lp by an angle of 90°. when the polarization direction of the polarized light Lp is rotated, the first light L1 may be emitted from the polarization rotator 120. The first light may have a second polarization direction crossing the first polarization direction. The second polarization direction may be parallel to the second direction DR2. For example, the second polarization direction may be perpendicular to the first polarization direction.

In an example embodiment, when the polarization rotator 120 is in an On-state, the polarization rotator 120 may maintain the polarization direction of the polarized light Lp. The On-state of the polarization rotator 120 is a state that an electrical signal is applied to the polarization rotator 120. When the polarization direction of the polarized light Lp is maintained, the second light L2 may be emitted from the polarization rotator 120. The second light L2 may have the first polarization direction. According to the application of an electrical signal to the polarization rotator 120, the polarization rotator 120 may selectively provide the first light L1 and the second light L2 to the composite filter 200.

The composite filter 200 may perform a first spatial filtering process and a second spatial filtering process, respectively, with respect to the first light L1 and the second light and L2 received from the polarization rotator 120 (S300). Referring to FIGS. 2 and 3, the composite filter 200 may include the first filter patterns 222 and the second filter patterns 224. The first filter patterns 222 may perform a first spatial filtering with respect to the first light L1. For example, the first filter patterns 222 may perform a Fourier transform process and a first phase modulation process with respect to the first light. A phase profile of the first filter patterns 222 may include a sum of a phase profile of a Fourier transform element and a phase profile of a first phase modulation element. The Fourier transform element may be an optical element that performs a Fourier transform with respect to the first light L1 and the second light L2. For example, the Fourier transform element may be a Fourier transform lens. Referring to FIG. 7, an example phase profile of the Fourier transform element may be provided. The first phase modulation element may be an optical element that modulates a phase of the first light L1 that is Fourier transformed. For example, the first phase modulation element may be a phase filter. FIG. 8 shows an example phase profile of the first phase modulation element.

The second filter patterns 224 may perform a second spatial filtering with respect to the second light L2. For example, the second filter patterns 224 may perform a Fourier transform process and a second phase modulation process with respect to the second light L2. A phase profile of the second filter patterns 224 may include a sum of a phase profile of a Fourier transform element and a phase profile of a second phase modulation element. The Fourier transform element may be an optical element that performs the Fourier transform with respect to the first light L1 and the second light L2. The Fourier transform element may be substantially identical to the above descriptions. The second phase modulation element may be an optical element that modulates a phase of the second light L2 that is Fourier transformed. For example, the second phase modulation element may be a phase filter. FIG. 9 shows an example phase profile of the second phase modulation element.

A phase profile of the composite filter 200 may include the sum of the phase profile of the first filter patterns 222 and the phase profile of the second filter patterns 224. Referring to FIG. 10, an example phase profile of the composite filter 200 may be provided. The composite filter 200 may provide the first light L1 that is first spatial filtered and the second light L2 that is second spatial filtered to the light receiver 300.

The light receiver 300 may generate first image data and second image data based on the first light L1 and the second light L2 received from the composite filter 200 (S400). The first image data may include image information of the first light L1 that is first spatial filtered. The second image data may include image information of the second light L2 that is second spatial filtered. The light receiver 300 may provide the first image data and the second image data to the image controller 400.

The image controller 400 may generate filtering image data based on the first image data and the second image data (S500). The image controller 400 may include a processor 410 and a memory 420. For example, the filtering image data may be generated by performing a subtraction operation in which the second image data is subtracted from the first image data. When the filtering image data is generated, the processor 410 may store the first image data and the second image data received from the light receiver 300 in the memory 420. When the filtering image data is generated, the processor 410 may retrieve the first image data and second image data stored in the memory 420, and may perform a subtraction operation with respect to the first and second image data. Accordingly, the filtering image data may be generated.

The present disclosure may provide a method of spatial filtering to generate filtering image data by controlling the polarization rotator 120. The present disclosure may provide a method of spatial filtering without replacing an optical device, for example, a phase filter. The present disclosure may provide a method of spatial filtering by using hardware. The present disclosure may provide a method of spatial filtering to reduce a spatial filtering time and cost. The present disclosure may provide a method of spatial filtering with respect to incoherent light and unpolarized light.

FIGS. 11 through 14 are images for explaining an experimental example of a method of spatial filtering according to example embodiments.

Figure 11:
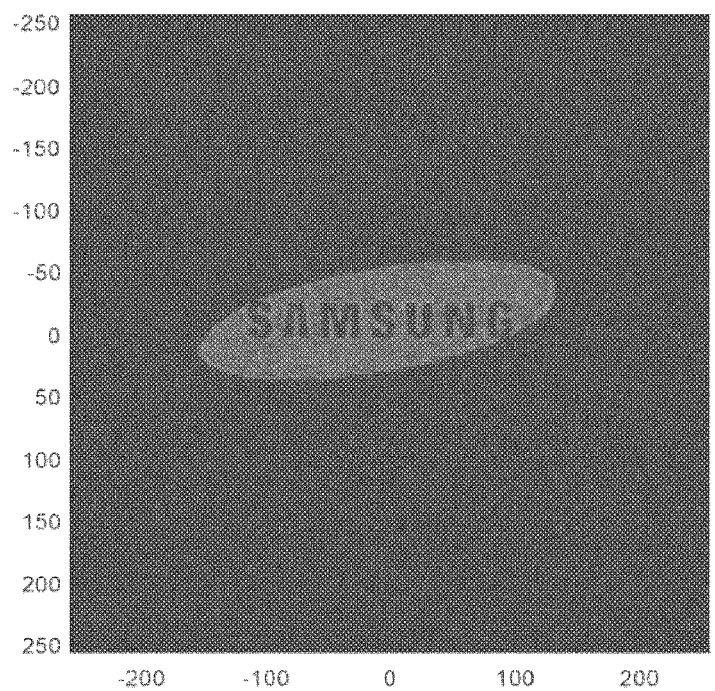
FIGS. 11, 12, 13, and 14 are images for explaining an experimental example of a method of spatial filtering according to example embodiments.
Figure 12:
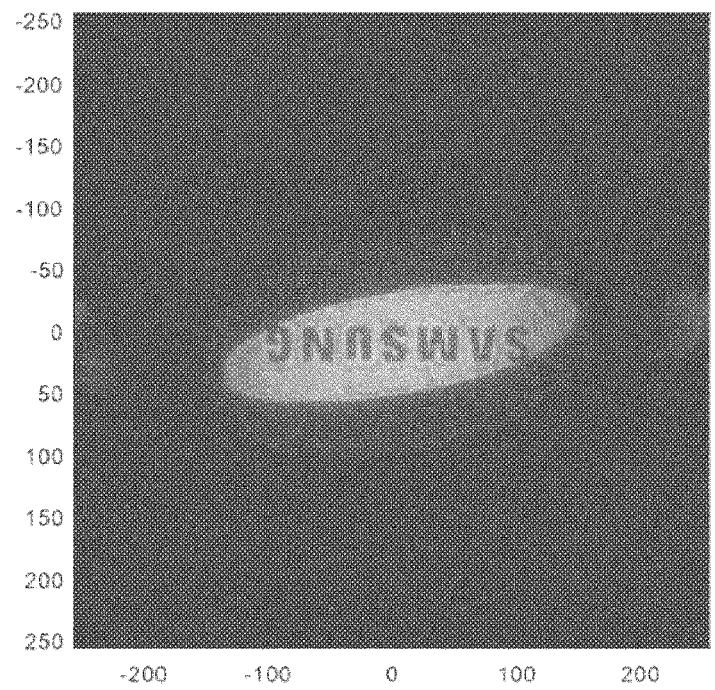
Figure 13:
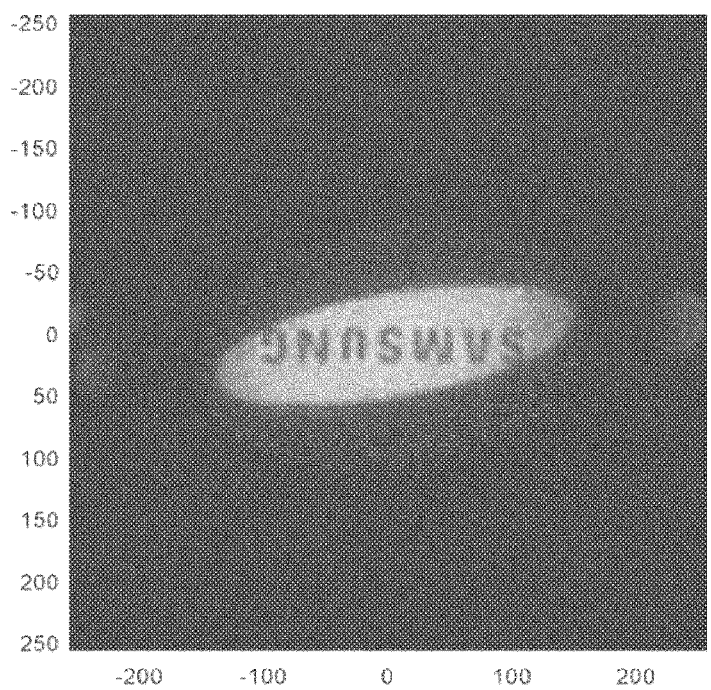
Figure 14:
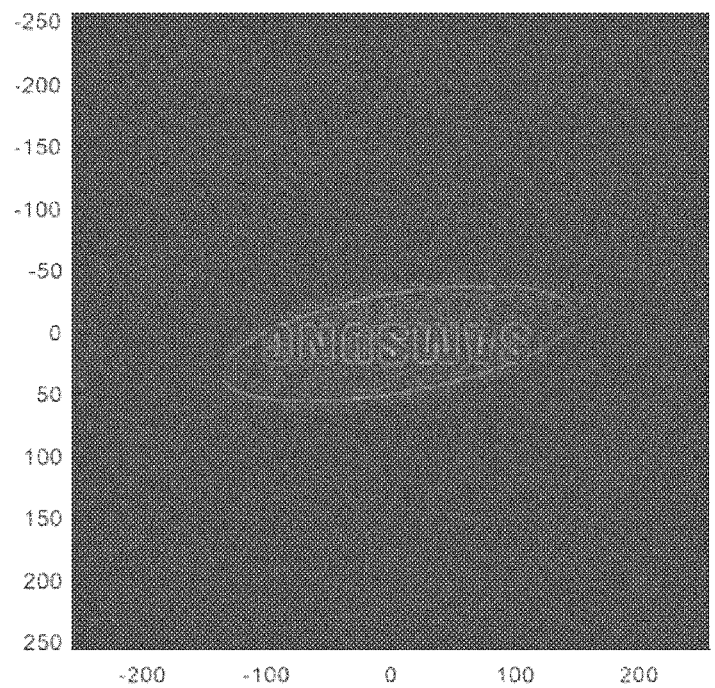

Referring to FIG. 11, an image of the object 1 is shown. Referring to FIG. 12, a first image that has undergone the first spatial filtering process is shown. The first image is outputted to a display apparatus based on first image data. Referring to FIG. 13, a second image that has undergone the second spatial filtering is shown. The second image is outputted on a display apparatus based on second image data. Referring to FIG. 14, a filtering image generated by performing a subtraction operation in which the second image is subtracted from the first image is shown. The filtered image is outputted on a display apparatus based on filtering image data.

Figure 15:
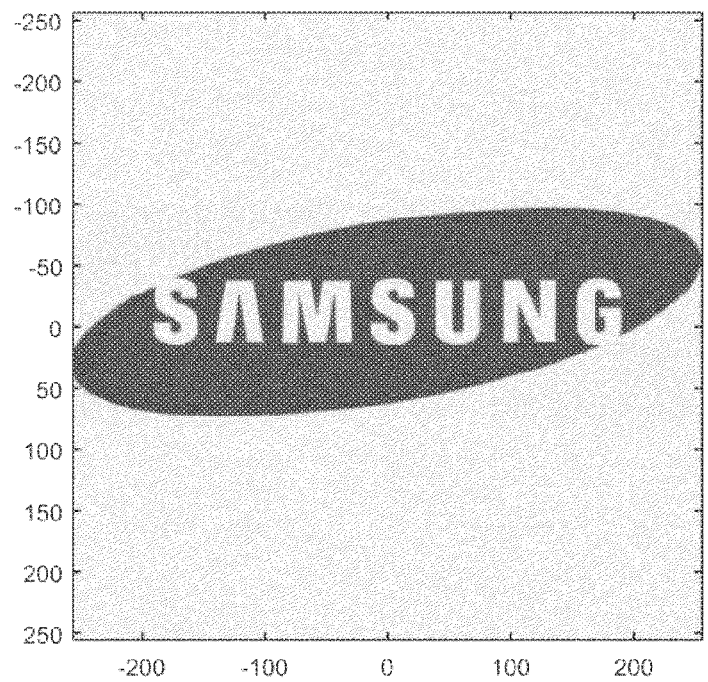
FIGS. 15 and 16 are diagrams for explaining an experimental example of a method of spatial filtering according to example embodiments.
Figure 16:
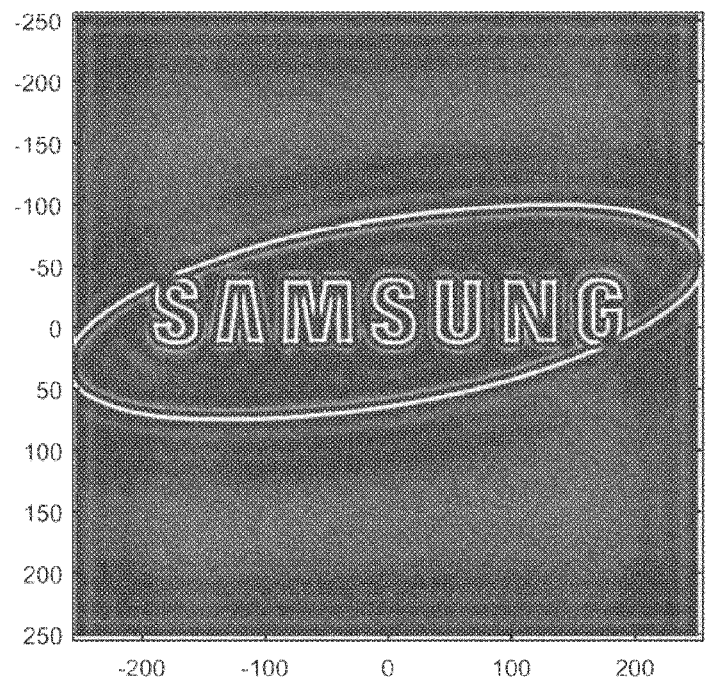

FIGS. 15 and 16 are images for explaining an experimental example of a method of spatial filtering according to example embodiments.

Referring to FIG. 15, an image of the object is shown. Referring to FIG. 16, a filtering image generated by performing a subtraction operation in which the second image is subtracted from the first image is shown. The filtering image is output to a display apparatus based on filtering image data.

Figure 17:
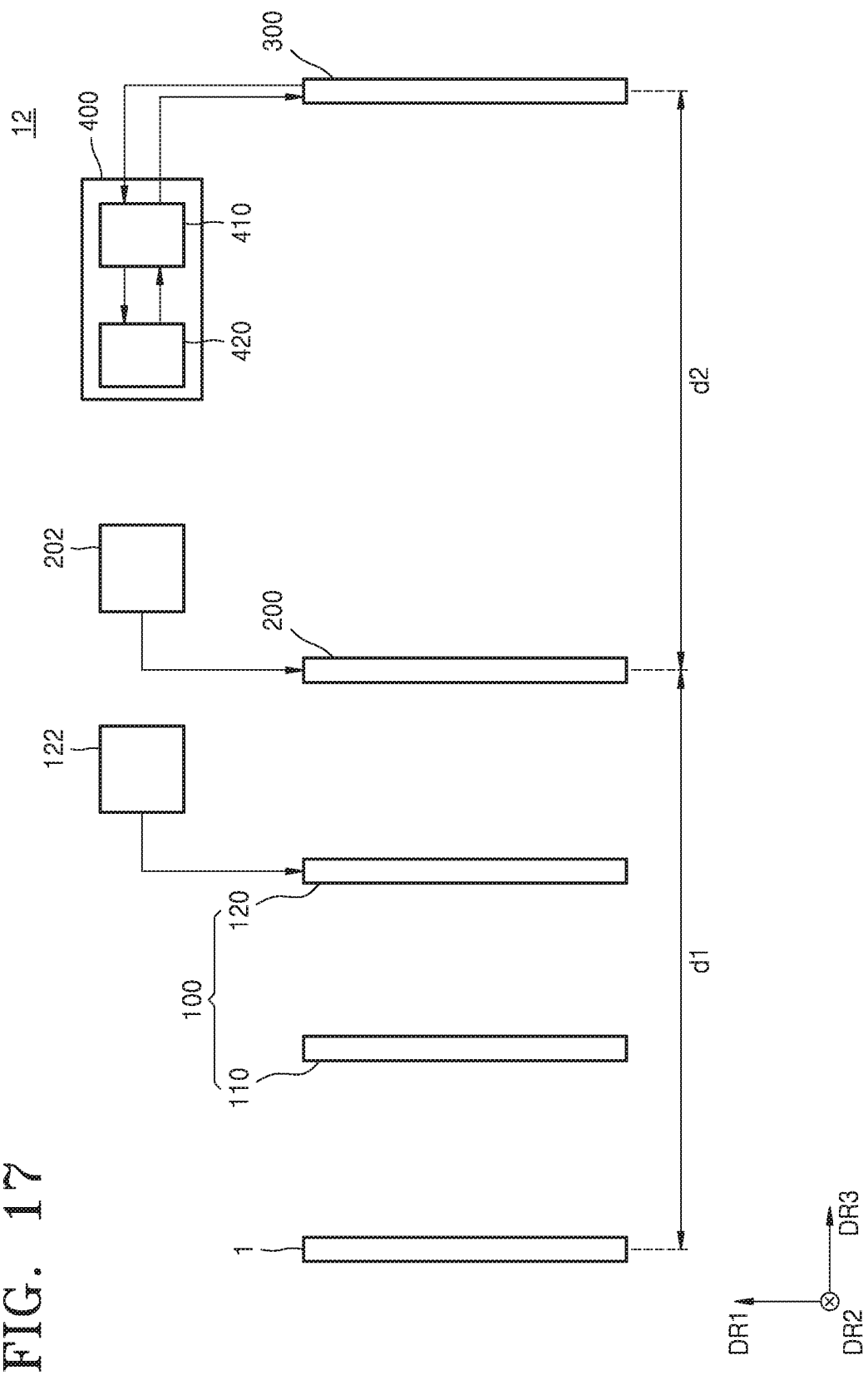
FIG. 17 is a conceptual diagram of a spatial filtering apparatus according to example embodiments.
Figure 18:
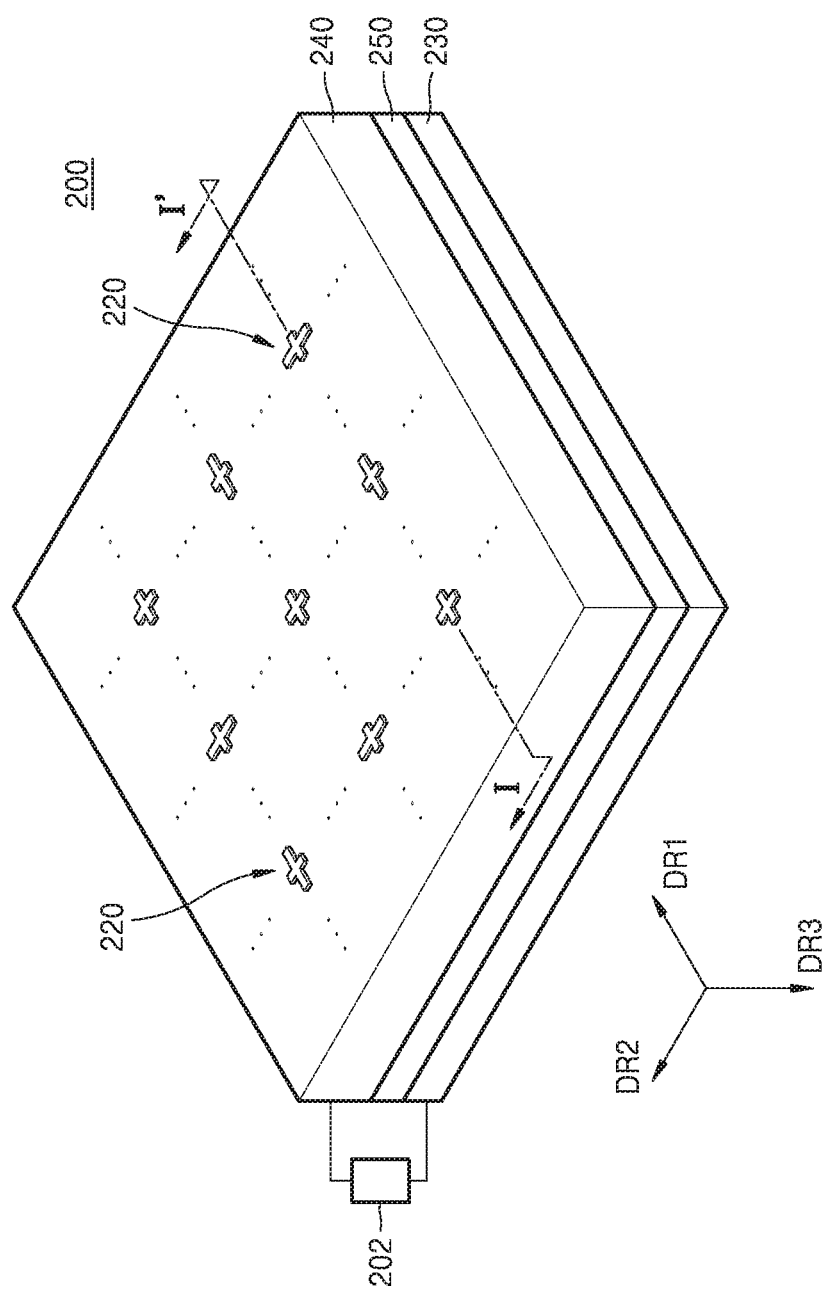
FIG. 18 is a perspective view of the composite filter of FIG. 1.
Figure 19:
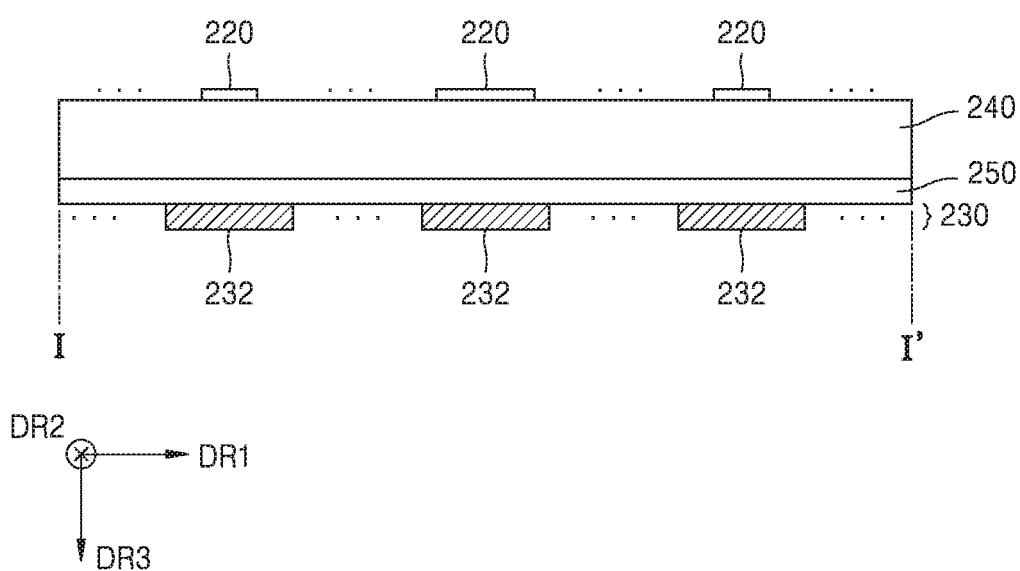
FIG. 19 is a cross-sectional view taken along line I-I' of FIG. 18.

FIG. 17 is a conceptual diagram of a spatial filtering apparatus according to example embodiments. FIG. 18 is a perspective view of the composite filter of FIG. 17. FIG. 19 is a cross-sectional view taken along line I-I' of FIG. 18.

Referring to FIGS. 17, 18 and 19, a spatial filtering apparatus 12 including a polarizer 100, a polarization controller 122, a composite filter 200, a filter controller 202, a light receiver 300, and an image controller 400 is provided. The polarizer 100 may include a polarizer 110 and a polarization rotator 120.

Referring to FIG. 17, the composite filter 200 may further include a lower electrode layer 230, an upper electrode layer 240, and an active layer 250. Composite filter patterns 220 may be provided on the upper electrode layer 240. The upper electrode layer 240 may be provided between the active layer 250 and the composite filter patterns 220. The active layer 250 may be provided between the upper electrode layer 240 and the lower electrode layer 230.

The lower electrode layer 230 may include lower electrode patterns 232. The lower electrode patterns 232 may be arranged in the first direction DR1 and the second direction DR2 parallel to the active layer 250. The lower electrode patterns 232 may respectively correspond to the composite filter patterns 220. For example, the lower electrode patterns 232 may respectively overlap the composite filter patterns 220 in a third direction DR3 that is perpendicular to the active layer 250. The lower electrode patterns 232 may include a conductive material. For example, the lower electrode patterns 232 may include at least one from copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au).

The upper electrode layer 240 may extend in the first direction DR1 and the second direction DR2. Unlike the lower electrode layer 230, the upper electrode layer 240 may include films arranged between the active layer 250 and the composite filter patterns 220. The upper electrode layer 240 may overlap the lower electrode patterns 232 and the composite filter patterns 220 in the third direction DR3. The upper electrode layer 240 may include a conductive material. For example, the upper electrode layer 240 may include at least one selected from the group consisting of Cu, Al, Ni, Fe, Co, Zn, Ti, Ru, Rh, Pd, Pt, Ag, Os, Ir, and Au.

The active layer 250 may have a refractive index that is changed by an electric field formed between the lower electrode layer 230 and the upper electrode layer 240. For example, the active layer 250 may include a transparent conductive oxide (TCO), such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). A wavelength of light that is filtered by the composite filter 200 may be determined according to the refractive index of the active layer 250.

The refractive index of the active layer 250 may be determined by controlling a magnitude and direction of an electric field between the lower electrode layer 230 and the upper electrode layer 240. Accordingly, the filter controller 202 may control a wavelength of light that is filtered by the composite filter 200 by controlling a voltage applied to the lower electrode layer 230 and the upper electrode layer 240.

The object 1 and the composite filter 200 may be spaced apart from each other by a first distance d1. The composite filter 200 and the light receiver 300 may be spaced apart from each other by a second distance d2. In example embodiments, the first distance d1 and second distance d2 respectively may be two times of a focal length of the composite filter 200. Accordingly, the spatial filtering apparatus 12 may include a 4F system.

The present disclosure may provide the spatial filtering apparatus 12 that generates filtering image data by controlling the polarizer 100. The present disclosure may provide the spatial filtering apparatus 12 that may perform a spatial filtering without replacing an optical device, for example, a phase filter. The present disclosure may provide the spatial filtering apparatus 12 that may perform a spatial filtering by using hardware. The present disclosure may provide the spatial filtering apparatus 12 that may reduce a spatial filtering time and cost. The present disclosure may provide the spatial filtering apparatus 12 that may filter incoherent light and unpolarized light.

Figure 20:
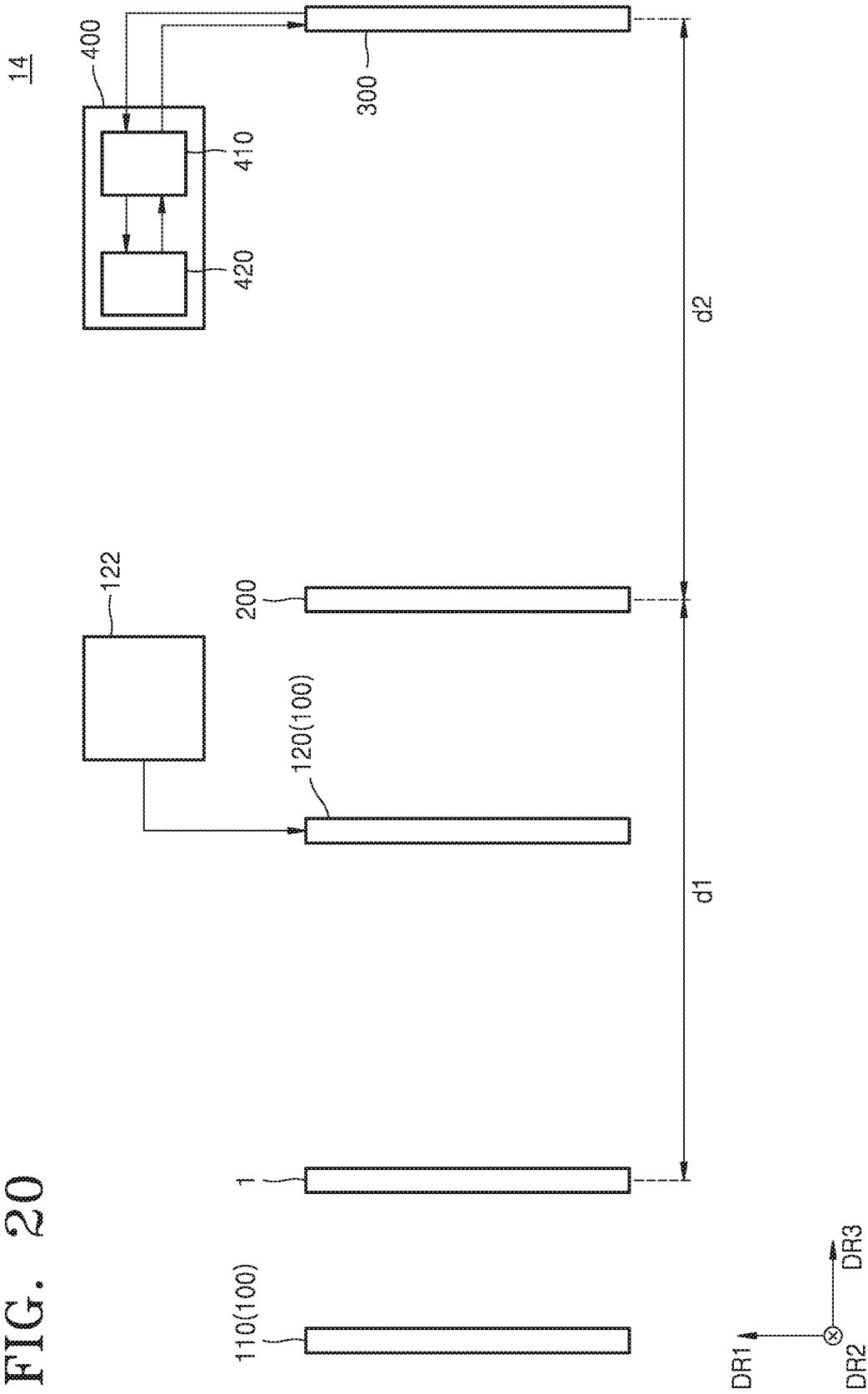
FIG. 20 is a conceptual diagram of a spatial filtering apparatus according to example embodiments.

FIG. 20 is a conceptual diagram of a spatial filtering apparatus according to example embodiments.

Referring to FIG. 20, a spatial filtering apparatus 14 including a polarizer 100, a composite filter 200, a polarization controller 122, a light receiver 300, and a image controller 400 may be provided. The polarizer 100 may include a polarizer 110 and a polarization rotator 120.

Referring to FIG. 20, an object 1 may be arranged between the polarizer 110 and the polarization rotator 120. External light may be provided to the polarizer 110. The external light may include incoherent light and unpolarized light. The polarizer 110 may emit polarized light by polarizing the external light. The polarized light may be equal to the polarized light described with reference to FIGS. 5 and 6. The polarizer 110 may provide the polarized light to the object 1. The polarized light may be provided to the polarization rotator 120 after transmitting the object 1. The polarized light may include image information of the object 1.

The polarization rotator 120 may selectively rotate the polarized light by being controlled by the polarization controller 122. When the polarization rotator 120 rotates the polarized light, the polarization rotator 120 may emit first light. The first light may be equal to the first light described with reference to FIG. 5. For example, when an electrical signal is not applied to the polarization rotator 120, the polarization rotator 120 may rotate the polarized light.

When the polarization rotator 120 does not rotate the polarized light, the polarization rotator 120 may emit a second light. The second light may be identical to the second light described with reference to FIG. 6. For example, when an electrical signal is applied to the polarization rotator 120, the polarization rotator 120 may not rotate the polarized light. The polarization rotator 120 may provide the first light and the second light to the light receiver 300.

The composite filter 200 may perform a first spatial filtering process and a second spatial filtering process with respect to the first light and the second light, respectively. The composite filter 200 may provide the spatially filtered first light and second light to the light receiver 300.

The light receiver 300 may generate first image data and the second image data by respectively accommodating the first light and the second light. The light receiver 300 may provide the first image data and the second image data to the image controller 400.

The image controller 400 may include a processor 410 and a memory 420. The processor 410 may generate filtering data based on the first image data and the second image data. When the filtering data is generated, the memory 420 may be used. For example, the processor 410 may store the first image data and second image data received from the light receiver 300 in the memory 420. When the filtering image data is generated, the processor 410 may retrieve the first image data and second image data from the memory 420, and the second image data may be subtracted from the first image data. Accordingly, the filtering image data may be generated.

The object 1 and the composite filter 200 may be spaced apart from each other by a first distance d1. The composite filter 200 and the light receiver 300 may be spaced apart from each other by a second distance d2. In example embodiments, the first distance d1 and second distance d2 respectively may be two times of a focal length of the composite filter 200. Accordingly, the spatial filtering apparatus 14 may include a 4F system.

The present disclosure may provide the spatial filtering apparatus 14 that generates filtering image data by controlling the polarizer 100. The present disclosure may provide the spatial filtering apparatus 14 that may perform a spatial filtering without replacing an optical device, for example, a phase filter. The present disclosure may provide the spatial filtering apparatus 14 that may perform a spatial filtering by using hardware. The present disclosure may provide the spatial filtering apparatus 14 that may reduce a spatial filtering time and cost. The present disclosure may provide the spatial filtering apparatus 14 that may filter incoherent light and unpolarized light.

FIG. 21 is a conceptual diagram of a spatial filtering apparatus according to example embodiments.

Referring to FIG. 21, a spatial filtering apparatus 16 including a polarizer 100, a polarization controller 122, a composite filter 200, a filter controller 202, a light receiver 300, and an image controller 400 may be provided. The polarizer 100 may include a polarizer 110 and a polarization rotator 120.

Apart from the polarizer 100, spatial filtering apparatus 16 may be substantially identical to the spatial filtering apparatus 12 described with reference to FIGS. 17 through 19.

The polarizer 100 may be substantially identical to the polarizer 100 described with reference to FIG. 20. The polarizer 110 and the polarization rotator 120 may arrange the object 1 between the polarizer 110 and the polarization rotator 120. The polarizer 100 may provide the first light and the second light to the composite filter 200.

The object 1 and the composite filter 200 may be spaced apart from each other by a first distance d1. The composite filter 200 and the light receiver 300 may be spaced apart from each other by a second distance d2. In example embodiments, the first distance d1 and the second distance d2, respectively, may be two times of a focal length of the composite filter 200. Accordingly, the spatial filtering apparatus 16 may include a 4F system The present disclosure may provide the spatial filtering apparatus 16 that generates filtering image data by controlling the polarizer 100. The present disclosure may provide the spatial filtering apparatus 16 that may perform a spatial filtering without replacing an optical device, for example, a phase filter. The present disclosure may provide the spatial filtering apparatus 16 that may perform a spatial filtering by hardware. The present disclosure may provide the spatial filtering apparatus 16 that may reduce a spatial filtering time and spatial filtering costs. The present disclosure may provide the spatial filtering apparatus 16 that may perform a spatial filtering incoherent light and unpolarized light.

The present disclosure provides a spatial filtering apparatus and a method of spatial filtering that may reduce a spatial filtering time and spatial filtering cost. The present disclosure provides a spatial filtering apparatus that may spatially filter incoherent light and unpolarized light.

While example embodiments have been described with reference to the figures, it will be understood by one of ordinary skill in the art that various changes in form and details may be made therein without departing from the spirit and scope of the present disclosure as defined by the following claims.

What is claimed is:

1. A spatial filtering apparatus comprising:
a composite filter comprising:
first filter patterns having a first phase profile; and
second filter patterns having a second phase profile,
wherein the first filter patterns and the second filter patterns overlap with each other,
wherein first light in a first polarization direction that is incident on the composite filter is first spatially filtered by the first filter patterns, and
wherein second light in a second polarization direction that is incident on the composite filter is second spatially filtered by the second filter patterns.

2. The spatial filtering apparatus of claim 1, wherein
the first filter patterns extend in the first polarization direction,
the second filter patterns extend in the second polarization direction, and
the first filter patterns cross the second filter patterns.

3. The spatial filtering apparatus of claim 1, wherein the composite filter further comprises:
a lower electrode layer;
an upper electrode layer provided on the lower electrode layer; and an active layer provided between the lower electrode layer and the upper electrode layer, and wherein the first filter patterns and the second filter patterns are provided on the upper electrode layer opposite to the active layer.

4. The spatial filtering apparatus of claim 3, further comprising a filter controller configured to generate a voltage difference between the lower electrode layer and the upper electrode layer, wherein a refractive index of the active layer is controlled by an electric field generated between the lower electrode layer and the upper electrode layer.

5. The spatial filtering apparatus of claim 1, wherein each of the first filter patterns has a length corresponding to the first phase profile in the first polarization direction, and wherein each of the second filter patterns has a length corresponding to the second phase profile in the second polarization direction.

6. The spatial filtering apparatus of claim 1, wherein the first phase profile comprises a sum of a phase profile of a Fourier transform element and a phase profile of a first phase modulation element, wherein the second phase profile comprises a sum of the phase profile of a Fourier transform element and a phase profile of a second phase modulation element, wherein the first light is Fourier transformed by the Fourier transform element and is first phase modulated by the first phase modulation element, and wherein the second light is Fourier transformed by the Fourier transform element and is second phase modulated by the second phase modulation element.

7. The spatial filtering apparatus of claim 1, further comprising a polarizer configured to selectively provide the first light and the second light to the composite filter.

8. The spatial filtering apparatus of claim 7, wherein the polarizer comprises:

a polarizer; and a polarization rotator, wherein the polarizer is configured to generate polarized light by polarizing external light received from the outside and provide the polarized light to the polarization rotator, and wherein the polarization rotator is configured to selectively rotate a polarization direction of the received polarized light and provide the first light and second light to the composite filter.

9. The spatial filtering apparatus of claim 8, further comprising a polarization controller configured to control the polarization rotator, wherein the polarization controller is configured to selectively rotate the polarization direction of the polarized light by controlling the polarization rotator.

10. The spatial filtering apparatus of claim 9, wherein the polarization direction of the polarized light is maintained by an electrical signal applied to the polarization rotator by the polarization controller, and wherein the polarization direction of the polarized light is rotated when the electrical signal is not applied to the polarization rotator.

11. The spatial filtering apparatus of claim 8, further comprising a light receiver provided on a side opposite to the polarization rotator with respect to the composite filter, wherein the light receiver is configured to detect the first light and the second light that are respectively emitted from an object and generated by being sequentially transmitted through the polarizer and the polarization rotator.

12. The spatial filtering apparatus of claim 11, wherein the polarization rotator and the polarizer are provided opposite to each other with the object therebetween.

13. The spatial filtering apparatus of claim 11, wherein a distance between the object and the composite filter is twice a focal length of the composite filter, and wherein a distance between the light receiver and the composite filter is twice the focal length of the composite filter.

14. A method of spatial filtering, the method comprising:

generating first light and second light by selectively rotating polarized light;

performing a first spatial filtering process and a second spatial filtering process to the first light and the second light, respectively;

generating first image data and second image data based on the first light and the second light; and generating filtering image data based on the first image data and the second image data, wherein the first spatial filtering process comprises performing a Fourier transform on the first light, and performing a first phase modulation process modulating a phase of the first light, and wherein the second spatial filtering process comprises performing a Fourier transform on the second light, and performing a second phase modulation process modulating a phase of the second light.

15. The method of claim 14, wherein the first spatial filtering process comprises providing the first light to first filter patterns such that the first light pass through the first filter patterns having a first phase profile, wherein the second spatial filtering process comprises providing the second light to second filter patterns such that the second light passes through the second filter patterns having a second phase profile, wherein the first phase profile and the second phase profile are different from each other.

16. The method of claim 14, wherein the generating of the filtering image data comprises subtracting the second image data from the first image data.

17. A spatial filtering apparatus comprising:

a polarizer;

a composite filter;

a light receiver; and an image controller, wherein the polarizer is configured to selectively provide first light in a first polarization direction and second light in a second polarization direction to the composite filter, wherein the composite filter is configured to spatially filter the first light and the second light, and provide the first light and the second light to the light receiver, wherein the light receiver is configured to provide first image data obtained based on the first light and second image data obtained based on the second light to the image controller, and wherein the image controller is configured to generate filtering image data based on the first image data and the second image data.

18. The spatial filtering apparatus of claim 17, wherein the composite filter comprises:

first filter patterns having a first phase profile; and second filter patterns having a second phase profile, wherein the first filter patterns overlap with the second filter patterns, and wherein the first light is first spatially filtered by the first filter patterns and the second light is second spatially filtered by the second filter patterns.

\* \* \* \* \*